United States Patent [19]
Bertorelli et al.

[11] Patent Number: 5,804,044
[45] Date of Patent: Sep. 8, 1998

[54] ELECTROLYSIS DEVICE AND METHOD USING A POROUS ELECTRODE

[75] Inventors: Claude Richard Bertorelli, Givry; Germain Marcel Lacoste, Tournefeuille, both of France

[73] Assignee: Eastman Kodak Company, Rochester, N.Y.

[21] Appl. No.: 522,888

[22] Filed: Aug. 31, 1995

Related U.S. Application Data

[63] Continuation of Ser. No. 321,077, Oct. 11, 1994, abandoned, which is a continuation of Ser. No. 949,532, Nov. 6, 1992, abandoned.

[30] Foreign Application Priority Data

May 7, 1990 [FR] France .................................. 90 05962

[51] Int. Cl.⁶ ...................................................... C02F 1/461
[52] U.S. Cl. ........................ 204/253; 204/267; 204/272; 204/275; 205/750; 205/754
[58] Field of Search .................. 205/750, 754; 204/222, 253, 267, 272, 275

[56] References Cited

U.S. PATENT DOCUMENTS

| | | | |
|---|---|---|---|
| 3,915,822 | 10/1975 | Veltman | 204/151 |
| 4,202,752 | 5/1980 | Sherwood et al. | 204/222 |
| 4,257,864 | 3/1981 | Gacki | 204/213 |
| 4,564,432 | 1/1986 | Nagai et al. | 204/237 |
| 4,585,539 | 4/1986 | Edson | 204/228 |
| 4,692,229 | 9/1987 | Bjäreklint et al. | 204/151 |
| 4,913,779 | 4/1990 | Lacoste | 204/1.11 |

FOREIGN PATENT DOCUMENTS 0 037 325   3/1981   European Pat. Off. .

OTHER PUBLICATIONS

R.L. Paul et al, Hydromettallurgy, "The Recovery of Gold From Concentrated Aurocyanide Solutions", Mar. 6–10, 1983, pp. 689–80.

*Primary Examiner*—Arun S. Phasge
*Attorney, Agent, or Firm*—Arthur H. Rosenstein

[57] ABSTRACT

The present invention relates to an electrolysis cell for percolating a solution in order to perform a chemical reaction, such as the cathodic reduction of a metal cation.

This cell includes for example a bed of cathodically biased particles 31, a plurality of counter-electrodes 33, located at the periphery of the bed of particles and anodically biased and an additional counter-electrode 38, anodically biased and located at the center of the bed.

This arrangement allows to modify the electrode potential inside the bed, in order to avoid the unwanted electrochemical reactions.

10 Claims, 3 Drawing Sheets

ELECTROLYSIS DEVICE AND METHOD USING A POROUS ELECTRODE

This is a continuation of application Ser. No. 08/321,077 filed Oct. 11, 1994 now abandoned. Which is a continuation of Ser. No. 07/949,532 filed Nov. 6, 1992 now abandoned.

FIELD OF THE INVENTION

The present invention relates to an electrolysis device and method by percolation through one or several porous electrodes and their application to an electrochemical reaction, particularly in order to recover metals from diluted ionic solutions.

BACKGROUND OF THE INVENTION

It is known to perform electrochemical reactions with electrolysis devices in which at least one of the electrodes consists of a bed of electroconductive particles, cathodically or anodically biased, according to the type of reaction considered. These electrodes, called porous electrodes or volume electrodes thus allow, due to their high specific surfaces, to process diluted ionic solutions for which the electrolysis current density is low.

The European Patent 37 325 describes such a device, the performance of which is improved by associating the porous electrode to several counter-electrodes. A particularly interesting embodiment of such a type of electrode consists in placing the counter-electrodes with respect to the porous electrode, in order that the generated electrical field is radial, i.e., perpendicular or nearly perpendicular to the flow direction of the electrolyte. Such devices are, for example, disclosed in FIGS. 5 and 6 of the aforementioned European Patent, wherein they are disclosed more in detail.

Such devices allow to carry out electrochemical reactions. In the case where this electrochemical reaction is a cathodic reduction, for example in order to recover metals, the porous electrode, in the form of a bed of particles, is used as a cathode.

In a cell comprising a porous cathodic electrode having a radial field with peripheral annular anodic counter-electrodes, the variation in the electrode E potential defined by the local value of the metal-solution potential difference in the bed of particles of the porous electrode according to the radius r of the electrode is shown in FIG. 1. It is determined that the potential varies rapidly as it is becoming less and less cathodic from the counter-electrodes and reaches a balance value in the central portion, the most remote from the counter electrodes. That means that not only the central portion of the bed of particles does not work, but also that the solution in contact with this portion of the bed can be the place where undesirable electrochemical reactions occur. For example, in the case where the device is used in order to recover silver from a photographic fixing salt solution containing bisulfite ions (HSO) and from a few mg to 10 g about of silver per liter, the potential measured by using a saturated mercury sulfate and sodium electrode as reference electrode, varies from −1000 to −750 mV, with as a result, the risk to reduce these bisulfite ions into sulfide and to interfere with the cathodic reduction of the silver ions, due to an undesirable sulfuration of the particles of the bed. Thus, it is desirable to overcome these drawbacks and to provide a better use of the bed of particles in the porous electrode.

SUMMARY OF THE INVENTION

As a result, the object of the present invention consists in providing an electrolysis cell comprising a porous electrode and having a radial field allowing to overcome the aforementioned drawbacks.

The electrolysis cell according to the invention includes:

at least one electrode consisting of a bed of electroconductive particles having a first polarity, a plurality of counter-electrodes, having a second polarity, characterized in that said cell comprises at least one additional counter-electrode, either located at the center of the bed of particles if the plurality of counter-electrodes is peripheral, or located at the periphery of the bed of particles if the plurality of counter-electrodes is at the center of the bed, in such a way that the resulting electric field is radial and perpendicular to the electrolyte flow in the bed of particles.

BRIEF DESCRIPTION OF THE DRAWINGS

According to an embodiment illustrated in FIG. 3, the electrolysis cell according to the invention includes:

1) a porous electrode 31, cathodically biased and consisting of a bed of conductive particles;

2) a plurality of outer counter-electrodes 33, anodically biased and located at the periphery of the bed of particles, and 3) One or several additional inner counter-electrodes 38, located at the center of the bed of particles, for example colinear with the axis of this bed, when the bed is cylindrical or prismatic. These counter-electrodes are separated from the bed of particles by an element 39 such as a porous similar to the separator 37.

Figure 1:
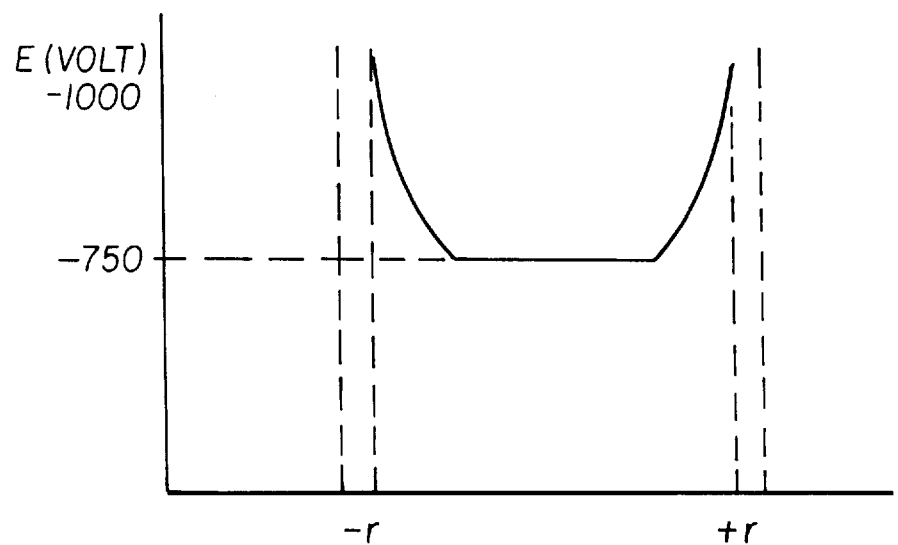
Figure 2:
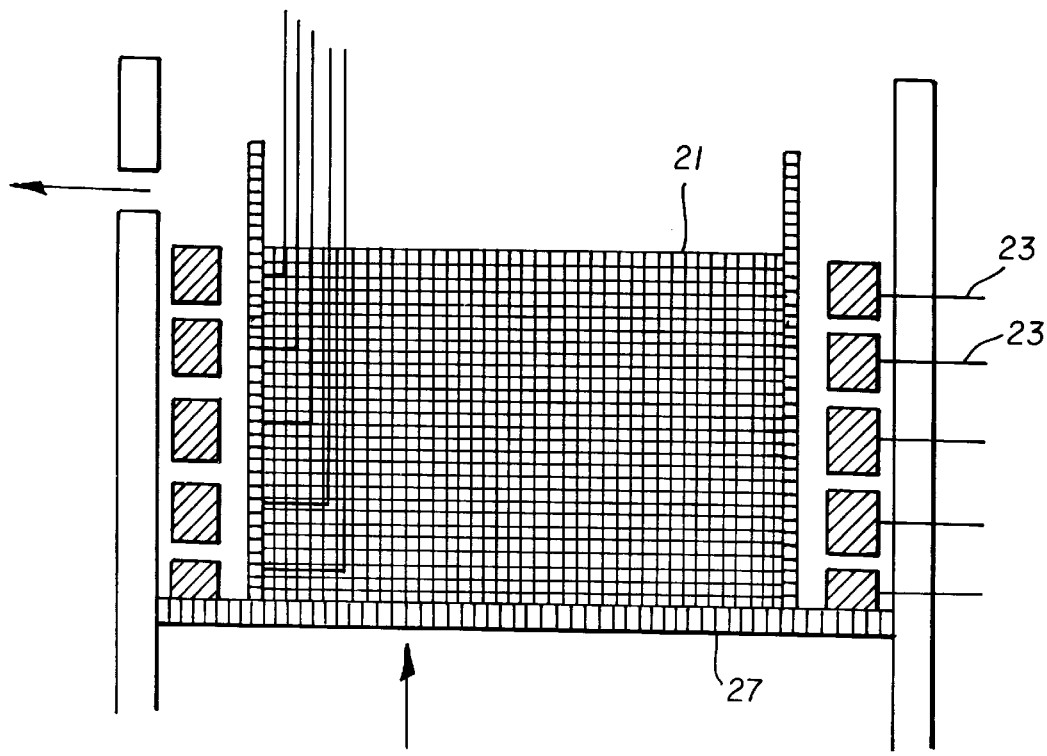

FIG. 2 illustrates a section view of an electrolysis cell having a radial field according to the European Patent 37 325, with a central porous cathode 21 (bed of conductive particles) and a plurality of peripheral counter-electrodes (anodes) 23. The bed of conductive particles 21 is separated from the counter electrodes 23 by a porous separator 27. In such an electrode, the potential profile is the one illustrated in FIG. 1, with the abovementioned drawbacks.

Figure 3:
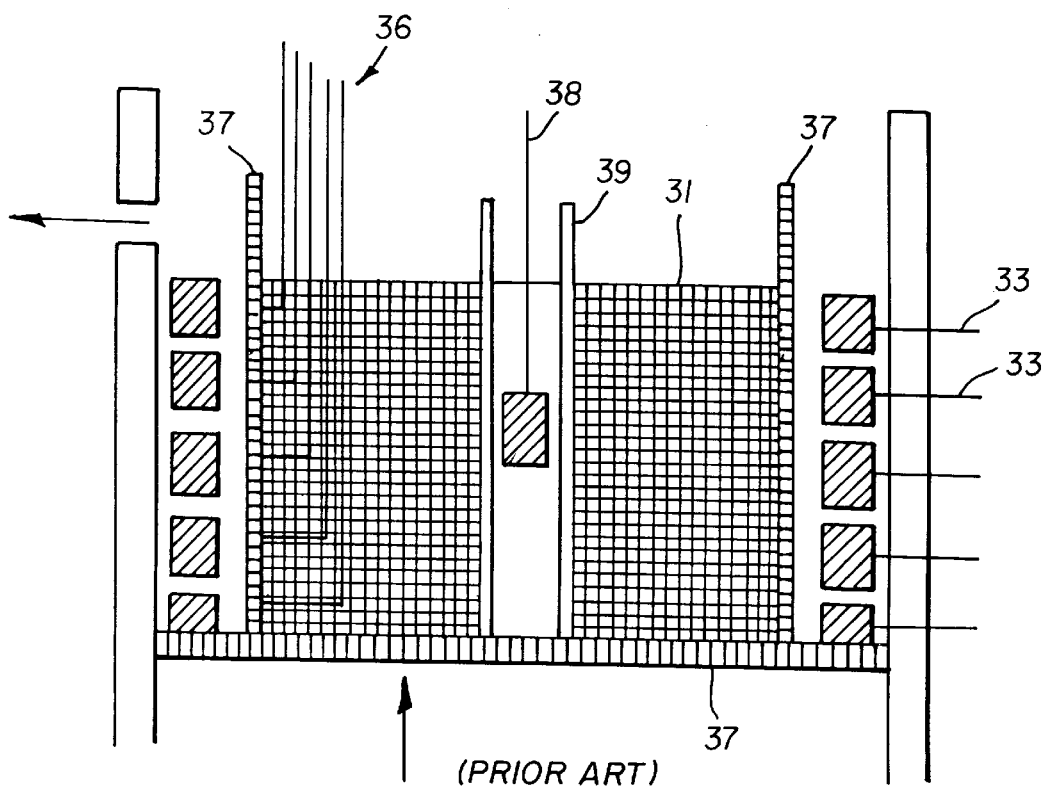

FIG. 3 illustrates a section view of an electrolysis cell similar to the one of FIG. 2, except that it is modified according to the present invention, in order to comprise an additional counter-electrode (anode) at the center of the bed of conductive particles.

Figure 4:
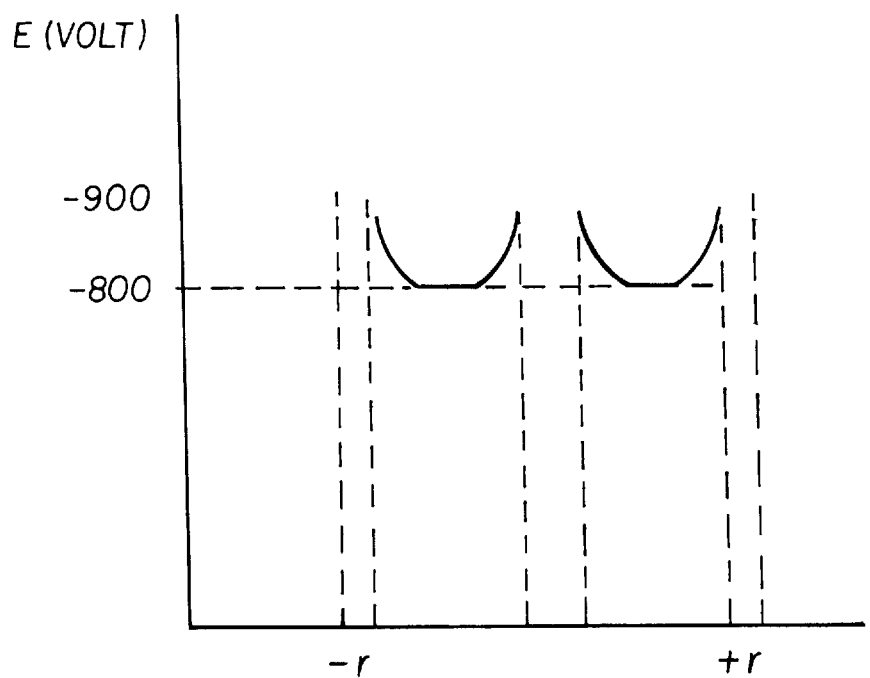

FIG. 4 illustrates the potential variation of the solution in the bed of particles of a cell having a porous cathode according to the invention such as illustrated in FIG. 3.

Figure 5:
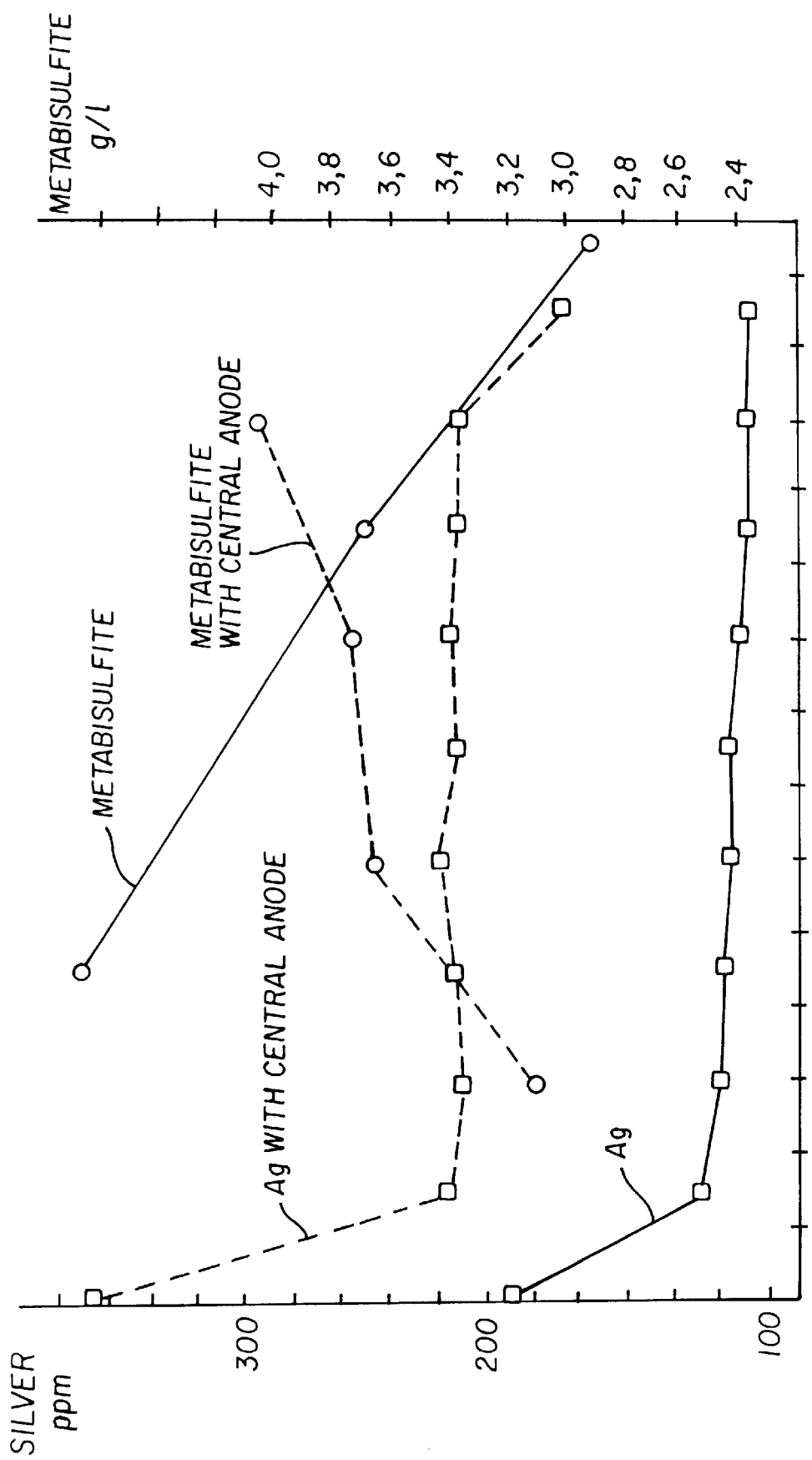

FIG. 5 illustrates the variation in the residual silver and bisulfite content of a cell according to the invention, with time.

DETAILED DESCRIPTION OF THE INVENTION

The porous electrodes used according to the invention generally consisted in particles or granules, having varying form and sizes, according to the electrochemical reaction considered. When it is desired to recover a metal by cathodic reduction, it is advantageous to use glass beads coated with a metallic deposit or metal beads. Carbon particles can also be used. The particle diameter is chosen according to the cell dimensions. When the electrolysis cell is operated in a fixed bed, i.e. with a low percolation rate, it is prefered to choose particles having an enough significant diameter, for example, ranging from 0,5 mm to 5 mm, in order to avoid the too rapid clogging up of the bed.

The counter-electrodes are conventionally achieved. In the case where the bed of particles is used as a cathode, the counter-electrodes act as anodes. They are formed of graphite or of metal. For example, graphite barrels or cylinders, metal grids or platinum wires can be used according to the type of cell.

Generally, the electrodes are separated from the counter-electrodes, by using a membrane allowing the passage of the ions, for example in porous alumina or in a porous plastic material; the membrane is formed of an inert material as regards to the electrochemical reactions present in the cell. The permeability of this membrane can be selective for certain ions. The additional counter-electrode is advantageously located in a particular compartment, isolated from the bed of particles by a membrane exhibiting a selective permeability, or merely by a physical separator in order to avoid short-circuits between anode and cathode.

The control of the electrode potentials at the ends of the bed of particles can be conventionally performed by means of a potentionstat. The potentionstat provides a D.C. voltage to the cell terminals and it keeps the voltage constant between the two points of the cell, for example, between a reference electrode and a point in the bed of particles near the reference electrode. A "reference" potential, chosen on the intensity-potential layer of the electrochemical reaction considered, is displayed on the potentiostat and permanently compared to the potential-solution in the bed of particles, as measured by the reference electrode. According to the deviation recorded between this potential and the reference potential, the potentiostat controller causes a variation in the anode potential which tends to cancel this deviation. The perturbations thus compensated can arise from variations in the concentrations, the flow rates, temperature, etc . . . According to an embodiment, the electrolyte which flows through the porous electrode is subjected to a pulsation, such that the particles of the bed forming this electrode were fluidized during a fraction of each pulsation cycle. This pulsation method is disclosed in the French Patent Application 8608331, applied on Jun. 6, 1986 in the name of the Polytechnical Institute of Toulouse.

The potential profiles illustrated in FIGS. 1 and 4 show which advantageous results can be obtained by using an additional counter-electrode according to the invention. Like the one of FIG. 1, the FIG. 4 profile corresponds to the use of the cell in order to perform the cathodic reduction of a photographic fixing salt solution including silver and bisulfite ions. With the cell according to the invention, including a porous cathode and two anodic compartments, the electrode potential varies only from −900 to −800 mV, thus allowing to avoid undesirable electrochemical reactions, to increase the "useful" portion of the bed, and to contribute to obtain metallic deposits having a more homogeneous profile in the bed of particles.

By particularly avoiding, thanks to the structure according to the invention, the undesirable reduction of the bisulfite, the sulfite consumption during electrolysis is reduced, while still maintaining the desilverizing capacity of the electrolysis cell.

EXAMPLE

An electrochemical cell having a radial field such as illustrated in FIG. 3 is performed; the annular bed 31 is formed of carbon particles acting as a cathode; the carbon particles have a 0,5 cm diameter and were subjected to a pre-silvering. The volume of the bed of particles is 10 l. The cell includes also nine separate anodes 33. The body of the cell is formed of a transparent Altuglas 60 poly(methyl methacrylate) cylinder having a 60 cm height and a 17 cm diameter.

The anodes 33 are formed of stainless steel grids; each anode is 2,8 cm wide and is separated from the following anode by a distance of 2,0 cm. The cell includes, opposite to each anode, a reference electrode 36 (saturated sodium and mercury sulfate electrode). The additional anode 38 is formed of a stainless steel rod. The anodic compartments of the anodes 33 and 38 are separated from the porous cathode 31 by porous polyethylene membranes 37 and 39 (commercionally available by VION company).

This cell having a radial field is used to electrolyze a solution containing 6 g of silver per liter, in presence of bisulfite (11 g/l).

The anodes are connected to a same potential source. The supply of the cell is achieved by means of a current, the potential of which can vary between 0 and 20 volts and the intensity between 0 and 20 A. The silver in this solution is fed by addition of 40 g of silver per hour (in the form of bromide), simulating the incorporation into a developed photographic material fixing salt.

For a 18 A intensity, the curves exhibiting the variations in the respective silver and sulfite concentrations with time are illustrated in FIG. 5, both for the cell according to the invention and for a similar cell, but not including an additional anode (no central anode in this case).

With the central additional anode, it is determined that the residual silver concentration decreases in order to be stabilized at a nearly constant residual value. But moreover, the sulfite concentration is maintained with the additional anode, whereas this concentration sinked in the absence of the additional anode.

We claim:

1. Electrolytic cell for percolating a solution containing metal ions in order to perform an electrochemical reaction to recover metal, comprising electrodes wherein said electrodes consist of a single electrode consisting of a bed of electro-conductive particles having a first polarity; and, a plurality of first counter-electrodes, having a second polarity, located at the periphery of said bed and at least one second counter-electrode located substantially at the center of the bed of particles so that the resulting electric field between the electrode and the first and second counter-electrodes is radial and substantially perpendicular to the solution flow in the bed of particles; and, wherein said cell further comprises a porous support beneath said bed, wherein the solution is introduced in order to fluidize said bed during the electrochemical reaction and means for subjecting said bed of particles to pulsation.

2. Electrolytic cell of claim 1, characterized in that the electrode and first and second counter-electrodes are separated from each other by porous walls which are ion permeable but not solution-permeable.

3. Electrolytic cell of claim 2, characterized in that the surface of the particles of the bed have been initially silver coated.

4. The electrolytic cell of claim 1 wherein the bed of particles is cathodically biased, the bed of counter electrodes is anodically biased, and a silver ion containing waste is circulated in said cell, while simultaneously an electrical current is flowed between the anode electrode and the cathode, such that silver ions are reduced and metal silver is deposited onto the particles of the bed.

5. Electrolytic cell of claim 1, characterized in that the surface of the particles of the bed have been initially silver coated.

6. Electrolytic cell according to claim 1 wherein the solution containing metal ions is subjected to said pulsation such that the particle bed is fluidized during a fraction of each pulsation cycle.

7. Electrolytic cell for percolating an aqueous photographic waste solution containing metal ions in order to perform an electrochemical reaction to recover metal, comprising electrodes, wherein said electrodes consist of a single electrode consisting of a bed of electroconductive particles having a first polarity; and, a plurality of first counter-electrodes, having a second polarity, located at the center of said bed, at least one second counter-electrode located at the periphery of the bed of particles so that the resulting electric field between the electrode and the first and second counter-electrodes is radial and substantially perpendicular to the solution flow in the bed of particles; and, wherein said cell further comprises a porous support beneath said bed, wherein the solution is introduced in order to fluidize said bed during the electrochemical reaction and means for subjecting said bed of particles to pulsation.

8. The electrolytic cell of claim 7, characterized in that the electrode and counter-electrodes are separated from each other by porous walls which are ion permeable but not solution permeable.

9. The electrolytic cell of claim 7, characterized in that the surface of the particles of the bed have been initially silver coated.

10. Electrolytic cell according to claim 7 wherein the solution containing metal ions is subjected to said pulsation such that the particle bed is fluidized during a fraction of each pulsation cycle.

\* \* \* \* \*